Aug. 8, 1939.   A. D. OLDS   2,168,749
SAFETY DEVICE FOR HEATERS
Filed April 8, 1939

INVENTOR
Ambrose D. Olds.
BY
Arthur C. Brown
ATTORNEY

Patented Aug. 8, 1939

2,168,749

UNITED STATES PATENT OFFICE 2,168,749

SAFETY DEVICE FOR HEATERS

Ambrose D. Olds, Wichita, Kans., assignor to The Coleman Lamp and Stove Company, Wichita, Kans., a corporation of Kansas Application April 8, 1939, Serial No. 266,797

6 Claims. (Cl. 126—116)

This invention relates to a safety device for heaters of the type commonly known as floor furnaces, and is a continuation in part of my application Serial No. 122,754, filed January 28, 1937.

Furnaces of this character are suspended below an opening in the floor and the opening is covered with a grill through which air is circulated to and from the furnace. Since the grill is located in the floor, it often happens that the outflow of heated air is retarded or restricted by various obstructions accidentally placed over the grill. For example, a rug or the like may accidentally slip over the grill so that the circulation is shut off. Consequently, due to the furnace construction, circulation is set up within the furnace and it becomes so hot that the obstruction and surrounding inflammable structure is ignited causing a disastrous fire.

It is, therefore, a principal object of the present invention to provide a furnace of this character with means for automatically cutting off the fuel supply when the temperature within the furnace reaches or exceeds a predetermined value.

In accomplishing this and other objects of the invention, as hereinafter pointed out, I have provided improved details of structure, the preferred form of which is illustrated in the accompanying drawing, wherein.

Figure 1:
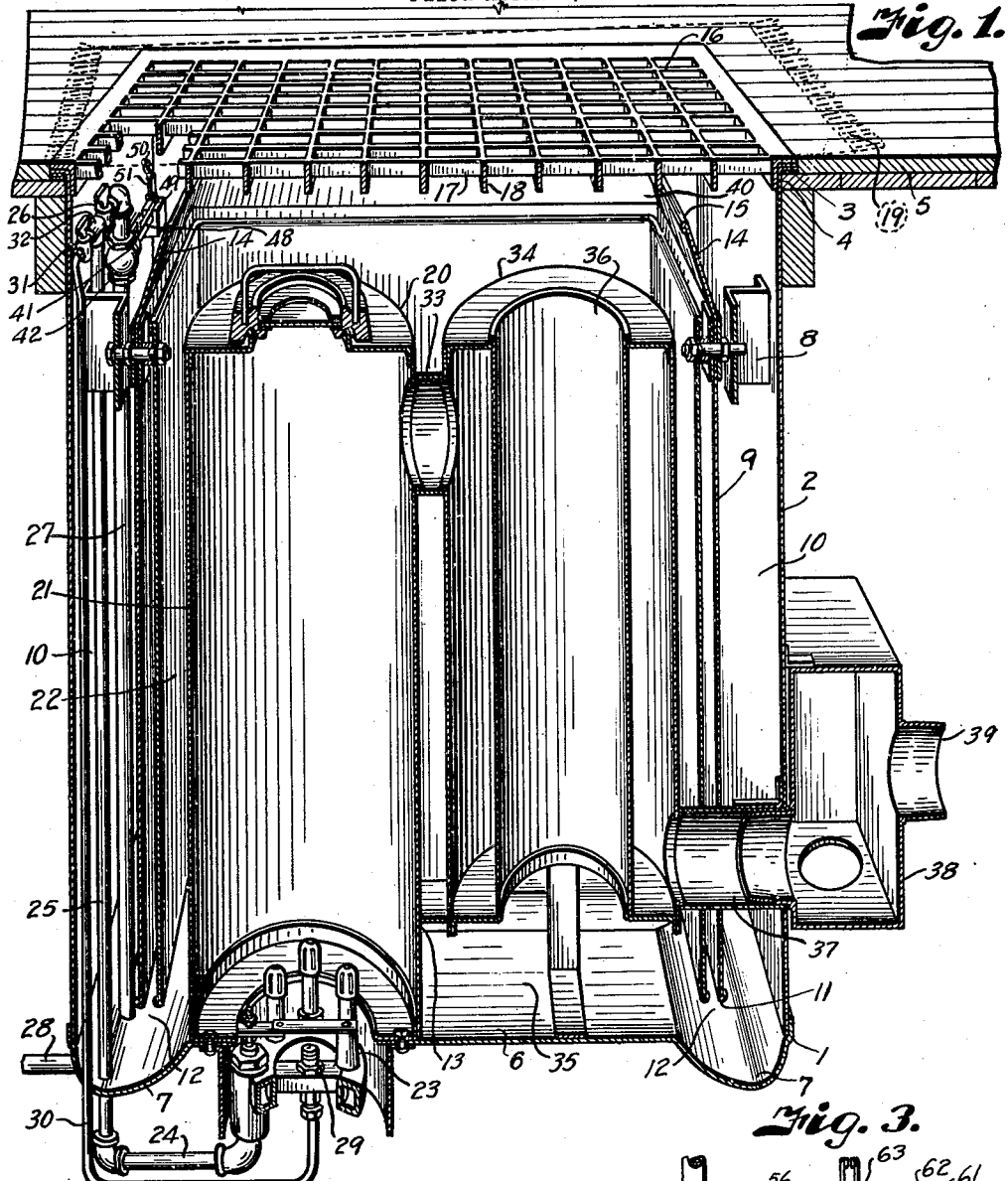
Fig. 1 is a vertical section through a floor furnace equipped with a safety device in accordance with the present invention and showing a rug (in dotted lines) accidently placed over the grill so that circulation of air to and from the furnace is cut off thereby.

Referring more in detail to the drawing:

1 designates a floor furnace including an outer casing 2 which, in the illustrated instance, is of substantially rectangular cross-section and has a perimetrical flange 3 for suspendingly supporting the casing within an opening 4 of a floor 5. The bottom of the casing is closed by a plate 6 having a marginal air deflecting portion 7.

Supported by suitable brackets 8 within the outer casing is an inner, double-walled casing 9 of smaller dimensions to provide vertical air passageways or ducts 10 between the sides of the respective casings. The lower edges 11 of the inner casing terminate short of the deflector portions 7 to provide air passageways 12 thereunder so that air moving downwardly within the passageways 10 is deflected upwardly in contact with a heater unit 13. The top of the inner casing terminates in inclined portions 14 with their upper edges 15 spaced below the flanged edges of the outer casing to form substantially funnel shaped entrances to the passageways 10 and to retard dispersion and give velocity to the heated air stream. The top of the outer casing is open and the opening is protected by a grill 16 supported at the marginal edges thereof above the flanges 3 so that the upper surface is substantially flush with the floor 5.

The grill 16 is shown as consisting of transverse and longitudinal bars 17 and 18 spaced above the edges 15 of the inwardly directed portions 14. The inlets of the passageways 10 therefore connect with the discharge space from the inner casing. This spacing is made necessary since the grill is separate from the furnace casing and is removable to permit withdrawal of the heater unit for cleaning thereof, inspection of the burner, and removal of dust and dirt that collect in the casings. This spacing may vary with the particular furnace installations but there is always sufficient clearance between the lower edges of the grill and the edges 15 that heated air circulates thereacross should the grill be accidently covered by, for example, a rug, as indicated by the dotted lines designated 19.

The heater unit in the furnace illustrated consists of a drum 20 arranged vertically within the inner casing and having the walls 21 thereof spaced from the inner walls of the inner casing to form passageways 22 therebetween.

The bottom of the drum seats over a gas or fuel oil burner 23 that is supplied with fuel through a pipe 24 having a leg portion 25 extending from the burner upwardly through the bottom of the furnace in one of the cold air passageways 10 to a point slightly below the bottom of the grill, where it is connected through a manually controlled shut-off valve 26 with a depending leg 27 in the passageway and through the bottom of the furnace to connect with a lateral pipe 28 leading from a source of fuel supply. The burner also includes a pilot 29 that is connected by a pilot line 30 with a shut off valve 31 carried in a T fitting 32 that connects the leg 25 with the valve 26.

The products of combustion from the burner pass upwardly in the drum and are discharged through a connection 33 with a drum 34 also having its side walls spaced from the side walls of the inner casing to provide passageways therearound and the bottom thereof terminates short of the furnace bottom to form an underneath passageway 35 having connection with the passageways 12.

Supported within the drum 34 and having its lower end connected with the passageway 35 is a flue 36 whereby a portion of air admitted to the furnace through the passageways 10 is passed upwardly in heating relation with the products of combustion circulating downwardly around the flue 36. The products of combustion are discharged through a flue outlet 37 into a check draft housing 38 and thence through an outlet 39 which is connected with a chimney or the like by a pipe (not shown).

Figure 2:
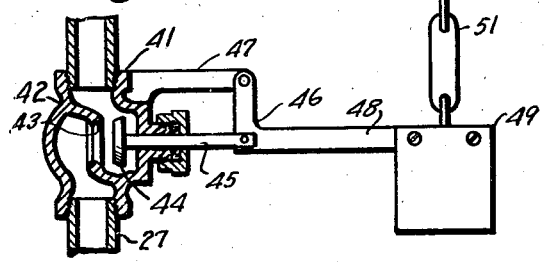
Fig. 2 is a fragmentary view partially in section of one form of fuel cut-off.

When a grill in a furnace constructed as described is obstructed, for example, by the rug indicated, the air in the furnace circulates downwardly through the passageways 10 and upwardly through the inner casing in contact with the hot surfaces of the heating unit. Since the heated air cannot escape through the grill, it is diverted laterally through the space 40 and is recirculated in contact with the heater unit. This circulation continues until the furnace gets so hot that the rug or other obstruction and inflammable materials about the heater are ignited. To avoid this difficulty, I have provided the fuel supply line with a safety shut-off device 41 which is preferably located at the upper end of the depending leg 27. The shut-off in the illustrated instance includes a valve body 42 having a seat 43 engageable by a valve 44 to shut off flow of fuel therethrough (see Fig. 2). The valve 44 has a stem 45 connected with an elbow lever 46 having one arm pivoted to a bracket arm 47 rigid with respect to the valve body. The other arm 48 of the elbow lever 46 carries a weight 49 which is normally supported from an anchor 50 by a fusible link 51. In the illustrated instance the anchor is shown as consisting of a pin projecting inwardly from the wall of the outer casing (Fig. 1).

The safety shut-off including the fusible link 51 is thus located in the cold air duct and adjacent the wall of the outer casing so that under normal operating conditions the temperature of the air passing thereover will not affect the fuse but when the grill is obstructed as by the rug, so that the hot air normally passing through the center of the grill is diverted over the edge 15 of the inner casing, the diverted hot air fuses the link. The weight is therefore released and swings downwardly to seat the valve. Seating of the valve suspends flow of fuel to the burner and shuts down operation of the furnace. The fusible link is so designed that the heat required to effect disruption thereof is substantially below the combustion point of any obstruction that may accidentally cover the grill, therefore the valve will be automatically operated before the recirculated air has become excessively hot.

The fuel supply cannot be restored until a new fusible link is substituted for the one previously disrupted, therefore the furnace cannot be operated until the condition which caused the shut down is corrected.

Figure 3:
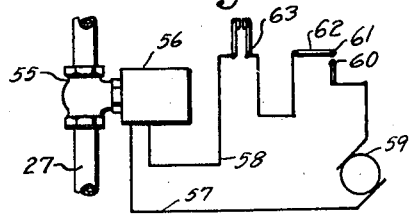
Fig. 3 is a diagrammatic view of another form of fuel cut-off.

In Fig. 3 I have shown an electrically operated means for shutting off the fuel supply. In this figure the valve 55 is controlled electrically by appropriate commercial mechanism enclosed in a casing 56 and energized by current flow in conductors 57 and 58 leading from a power generator 59 or other suitable source of supply. Connected in the circuit and located within the upper end of one of the cold air passageways 10 is a thermostat switch including a fixed contact 60 and a movable contact 61 carried by a bi-metallic arm 62, however, the thermostat may be of any appropriate construction to effect operation of the valve closing mechanism. Normally the contacts are closed but when the surrounding temperature becomes hotter than the predetermined value, as when the air is circulated within the furnace, the bi-metallic arm 62 will open the contacts and effect seating of the valve. In addition, this circuit may be utilized for automatic operation of the furnace responsive to room temperature by extending one of the conductors to include a thermostatic switch 63 located in the room to be heated.

From the foregoing it is obvious that I have provided a floor furnace of the character described with an automatic safety device for shutting off the fuel supply in case heated air tends to circulate within the furnace, as when a rug or other obstruction is accidently placed across the grill.

It is obvious that various forms of fuel shut-off devices may be used and I therefore do not wish to be limited to the specific forms illustrated and described.

What I claim and desire to secure by Letters Patent is:

1. In combination with a floor furnace having up and down-draft passages interconnected at both ends respectively, a heater unit in the up-draft passage, a floor grill covering said passages wherethrough cool air flows into the down-draft passage and heated air discharges from the up-draft passage, means supplying fuel to the heater unit, a valve controlling said fuel supply, and temperature responsive means located under said grill in the down-draft passage and having connection with the valve for effecting suspension of the fuel supply when circulation of hot air is set up through the interconnected passages by way of the connected ends of said passages upon accidental blocking of air flow through said grill.

2. In combination with a floor furnace including an outer casing, an inner casing spaced from the outer casing and cooperating therewith to form a down-draft passage, a heater in the inner casing spaced from the walls of said inner casing to form an up-draft passage connecting with the down-draft passage, a floor grill spaced from the inner casing and covering said outer casing wherethrough air flows into the down-draft passage and discharges through the up-draft passage, means supplying fuel to the heater, a valve controlling said fuel supply, and temperature responsive means located under said grill and having connection with the valve for effecting suspension of the fuel supply when circulation of hot air is set up within the furnace and through said space under the grill upon accidental blocking of air flow through said grill to and from said passages.

3. In a floor furnace having up-draft and down-draft passages interconnected at both ends respectively, a heater in the up-draft passage, a floor grill covering the passages wherethrough air flows into the down-draft passage and discharges through the up-draft passage, means supplying fuel to the heater, an electrically operated valve controlling said fuel supply, a circuit for supplying an operating current to said valve, and temperature responsive means in said down-draft passage and having connection with said circuit for effecting closure of said valve when circulation of hot air is set up through said end connections of the draft passages upon accidental blocking of air flow through said grill.

4. In combination with a floor furnace including an outer casing, an inner casing spaced from the outer casing and cooperating therewith to form a down-draft passage, a heater in the inner casing spaced from the walls of said inner casing to form an up-draft passage communicating with the down-draft passage, a floor grill spaced above the inner casing and covering the outer casing wherethrough air flows into the down-draft passage and discharges through the up-draft passage, means supplying fuel to the heater, an electrically operated valve controlling said fuel supply, a circuit for supplying an operating current to said valve, and temperature responsive means in said circuit and located in close proximity to the under side of said grill for effecting closure of said valve when circulation of hot air is set up through said space under the grill upon accidental blocking of air flow through said grill to and from said passages.

5. In combination with a floor furnace including an outer casing, an inner casing spaced from the outer casing and cooperating therewith to form a down-draft passage, a heater in the inner casing spaced from the walls of said inner casing to form an up-draft passage connecting with the down-draft passage, a floor grill spaced above the inner casing and covering the outer casing wherethrough air flows into the down-draft passage and discharges through the up-draft passage, a pipe line for supplying fuel to the heater, a valve in said pipe line controlling said fuel supply, means tending to close said valve, and a fusible element located under said grill and having connection with the valve closing means for effecting closure of the valve when the hot air diverted through said space under the grill upon accidental blocking of air flow through said grill is sufficient to fuse said element.

6. In combination with a floor furnace including an outer casing, an inner casing spaced from the outer casing and cooperating therewith to form a down-draft passage, a heater in the inner casing spaced from the walls of said inner casing to form an up-draft passage connecting with the down-draft passage, a floor grill spaced above the inner casing and covering said outer casing wherethrough air flows into the down-draft passage and discharges through the up-draft passage, a pipe for supplying fuel to the heater and extending upwardly in said down-draft passage, a valve in said pipe and located under said grill, a weight for closing said valve, and a fusible link supporting the weight with the valve in open position and adapted to fuse when circulation of hot air is set up through said space under the grill to close said valve in case of accidental covering of the grill.

AMBROSE D. OLDS.